US 8,628,021 B2

(12) United States Patent
Jones

(10) Patent No.: US 8,628,021 B2
(45) Date of Patent: Jan. 14, 2014

(54) DEBIT/CREDIT CARD DEVICE

(76) Inventor: Craig L. Jones, Hamden, CT (US)

( * ) Notice: Subject to any disclaimer, the term of this patent is extended or adjusted under 35 U.S.C. 154(b) by 202 days.

(21) Appl. No.: 12/846,006

(22) Filed: Jul. 29, 2010

(65) Prior Publication Data

US 2012/0024945 A1 Feb. 2, 2012

(51) Int. Cl.
*G06K 19/06* (2006.01)
(52) U.S. Cl.
USPC .......................... 235/492; 235/487; 235/488
(58) Field of Classification Search
USPC ................................. 235/487, 488, 492, 493
See application file for complete search history.

(56) References Cited

U.S. PATENT DOCUMENTS

| 4,614,861 A | 9/1986 | Pavlov et al. |
| 4,701,601 A | 10/1987 | Francini et al. |
| 4,766,293 A | 8/1988 | Boston |
| 4,938,377 A | 7/1990 | Jarvis |
| 4,968,873 A | 11/1990 | Dethloff et al. |
| 5,530,232 A | 6/1996 | Taylor |
| 5,748,737 A | 5/1998 | Daggar |
| 5,955,961 A | 9/1999 | Wallerstein |
| 6,402,039 B1 | 6/2002 | Freeman et al. |
| 6,547,130 B1 | 4/2003 | Shen |
| 6,592,044 B1 | 7/2003 | Wong et al. |
| 6,820,804 B2 | 11/2004 | Segal et al. |
| 6,925,439 B1* | 8/2005 | Pitroda .......................... 705/1.1 |
| 6,954,133 B2 | 10/2005 | McGregor et al. |

* cited by examiner

*Primary Examiner* — Michael G Lee
*Assistant Examiner* — Tabitha Chedekel
(74) *Attorney, Agent, or Firm* — St. Onge Steward Johnston & Reens LLC

(57) ABSTRACT

A debit/credit card (chip card) having a body, storage element, at least one processor, a display element (LCD screen) and at least one touchpad, allowing a user to manually enter electronic information to be stored by the at least one storage element and displayed by the at least one display element, such that the at one display element displays the electronic information in the form of at least two credit and/or debit card transactions. A method of keeping track of a person's spending, the method involving providing a chip card, manually entering the electronic information; and viewing the electronic information on the at least one display element, the at least one display element displaying at least two credit and/or debit card transactions.

15 Claims, 3 Drawing Sheets

DEBIT/CREDIT CARD DEVICE

FIELD OF THE INVENTION

This invention relates to the field of data or transaction cards containing semiconductors, microprocessors and/or memory chips allowing for a user to store information on the microprocessor of a credit card.

BACKGROUND OF THE INVENTION

Data or transaction cards that are able to store information on them are commonly referred to as chip cards (or smart cards). These data cards are usually wallet-size or smaller, and contain a microchip and/or semiconductor built into the card. Often, there are electrical contacts on the surface of the card through which communications are made between an external chip card device and the semiconductor chip. Data cards are now being used in numerous applications, including telecommunications, government benefit programs, health care, public transportation and universities. Other uses of these cards are in vending machines and retail stores.

One of the widespread uses of chip cards today is as a stored-value card, which contains monetary value in the microchip embedded in the card. For example, each time a consumer uses a chip card in a vending machine, the amount of the purchase is deducted from the cash balance stored in the microchip on the chip card. One application for such stored-value chip cards is to eliminate the need for people to carry around small coins or bills and speed up the time it takes to consummate small cash transactions.

When using chip cards in such a way, it is advantageous for the chip card to be able to have a built-in mechanism for viewing the cash balance remaining on the chip card and manually entering in transactions to manually keep track of the cash balance remaining on the chip card. None of the prior art references appear to allow for a chip card that serves such a function, which is user friendly, convenient, and allows a user to manually enter and keep track of the cash balance remaining on the chip card.

U.S. Pat. No. 6,402,039 (Freeman et al.) teaches a credit card having a display for allowing the purchase amount and the balance left on the card. This patent teaches a microprocessor, semiconductor chip, and integrated circuit. However, Freeman et al. do not teach a touchpad for entering in transactions. Furthermore, Freeman et al. do not suggest that it is possible to place a touchpad to enter in transactions on the face of the card, as the display in Freeman et al. appears to cover the entire surface area of one side of the card and there would be no room on the face of the card for a touchpad.

U.S. Pat. No. 4,614,861 (Pavlov et al.) teaches an LCD screen, and a keypad on a credit card. However, this reference does not teach that the LCD screen can show multiple transactions, as the display 14 of Pavlov et al. is small in size. Furthermore, Pavlov et al. is used to visually display card verification information, and is not used for allowing a user to view and or manually enter multiple credit card transactions that have been previously conducted. This is not a function or purpose of the Pavlov et al. reference.

U.S. Pat. No. 6,954,133 (McGregor et al.) teaches a credit card having an LCD screen, microprocessor, battery and storage device and touchpad. However, the LCD display 820 of McGregor et al. does not show multiple credit card transactions. Furthermore, the display of McGregor is used for displaying security key information and is not used to display multiple credit card transactions that have been previously conducted by the user.

U.S. Pat. No. 6,820,804 (Segel et al.) teaches a credit card showing transactions having a touch pad and display screen, and being able to link to a database. However, Segel et al.'s display is for a transaction form such as a credit card slip having a signature entry area, and similarly to other references, Segel et al. do not teach that the display shows multiple credit card transactions.

U.S. Pat. No. 6,592,044 (Wong et al.) teaches a credit card having a touch pad, LCD screen, buttons and a storage unit having electronic capabilities; U.S. Pat. No. 5,955,961 (Wallerstein) teaches a transaction card having a touchpad, LCD screen, buttons and CPU; U.S. Pat. No. 5,748,737 (Daggar) teaches a programmable card fitted into an electronic wallet; U.S. Pat. No. 5,530,232 (Taylor) teaches a data card comprising memory and circuitry; U.S. Pat. No. 4,968,873 (Dethloff et al.) teaches a chip card that can be programmed; U.S. Pat. No. 4,766,293 (Boston) teaches a card having a touchpad, LCD readout, storage and method of converting currencies, and method for determining transaction limits; and U.S. Pat. No. 4,701,601 (Francini et al.) teaches a card having a touchpad, LCD readout, storage and method of converting currencies, and method for determining transaction limits.

However, none of the prior art references teach a debit/credit card having a processor, LCD screen and touchpad, so that a user may manually keep track of and view his/her transactions, including multiple transactions.

It is advantageous for a user to be able to enter in and keep track of multiple transactions and the current balance of the user, as this allows a user to have the most up to date information regarding his/her balance, which helps the user from exceeding the limit of the card. Furthermore, allowing a user to enter in and keep track of multiple transactions allows a user view only the transactions that they entered, so as to easily identify fraudulent credit card transactions, which would not appear on the data card or chip card device.

Thus, it is desirable and an object of the present invention to provide a debit/credit card (chip card) having a processor, a display (LCD screen) and touchpad, so that a user may manually keep track of and view his/her transactions, including multiple transactions. It is further desirable and an object of the present invention to provide a debit/credit card (chip card) that requires a security pin to be entered, such as a four digit pin, so that the card has an additional security layer before allowing a user to manually enter in transactions.

SUMMARY OF THE INVENTION

Thus, it is an object of the present invention to provide for a chip card, such as a debit/credit card, having a processor, LCD screen and touchpad, so that a user may manually keep track of and view his/her transactions, including multiple transactions.

Another object of the invention to provide a debit/credit card (chip card) that requires a security pin, such as a four digit pin, to secure the card before allowing a user to manually enter in transactions.

These and other objectives are achieved by providing a chip card for viewing and storing credit and/or debit card transactions comprising: a body having at least two faces; at least one storage element for storing electronic information, the storage element enclosed within the body; at least one processor, the at least one processor able to process and receive electronic information, and the at least one processor enclosed within the body; at least one display element for displaying the electronic information, the at least one display element being located on one of the at least two faces of the body; and at least one touchpad allowing a user to manually enter the electronic information to be stored by the at least one storage element and displayed by the at least one display element, wherein the at least one display element displays the electronic information in the form of at least two credit and/or debit card transactions.

The at least one display element may be an LCD screen. The at least one touchpad may be an alphanumeric pin pad.

The at least one display element may display up to five credit and/or debit card transactions at a time.

The chip card may further comprise a clearance button for clearing the electronic information. The at least one touchpad may further comprise an enter button for entering in the transactions.

The at least two credit and/or debit card transactions may comprise the date, remaining balance as of the transaction and amount charged in the transaction.

The electronic information stored may further comprise additional data that can be entered via the at least one touchpad. Such data may be the location the information was entered at, visual reminders of the transaction and other such data. This is useful for security purposes at it will allow a user to keep track of the transaction that the user participated in.

The processor of the chip card may be a microprocessor or semiconductor.

The chip card may further comprise a security element, the security element requiring a security pin to be entered prior to allowing the processor to access the at least one storage element for storing electronic information.

The at least one touchpad may further comprise a scroll pad allowing a user to scroll through the at least two credit and/or debit card transactions.

The chip card may further comprise a second display element for displaying the remaining balance left on the chip card.

Other objectives of the invention are achieved by providing a chip card for viewing and storing credit and/or debit card transactions comprising: a body having at least two faces; at least one storage element for storing electronic information, the storage element enclosed within the body; at least one microprocessor, the at least one microprocessor able to process and receive electronic information, and the at least one processor enclosed within the body; at least one LCD screen for displaying the electronic information, the at least one display element being located on one of the at least two faces of the body; a security element requiring a security pin to be entered prior to allowing the processor to access the at least one storage element for storing electronic information; at least one alphanumeric pin pad comprising a keypad, a clearance button, an enter button and a scroll pad, the at least one alphanumeric pin pad allowing a user to manually enter the electronic information to be stored by the at least one storage element and displayed by the at least one display element, wherein the at least one display element displays the electronic information in the form of at least two credit and/or debit card transactions, and wherein the at least two credit and/or debit card transactions comprise the date, remaining balance as of the transaction and amount charged; and a second display element for displaying the remaining balance left on the chip card.

Other objectives of the invention are achieved by providing a method for keeping track of a person's spending, the method comprising the steps of: (1) providing a chip card comprising: a body having at least two faces; at least one storage element for storing electronic information, the storage element enclosed within the body; at least one processor, the at least one processor able to process and receive electronic information, and the at least one processor enclosed within the body; at least one display element for displaying the electronic information, the at least one display element being located on one of the at least two faces of the body; and at least one touchpad allowing a user to manually enter the electronic information to be stored by the at least one storage element and displayed by the at least one display element; (2) manually entering the electronic information; and (3) viewing the electronic information on the at least one display element, the at least one display element displaying at least two credit and/or debit card transactions.

The method may further comprise the step of the entering a security pin to allow access to the chip card prior to the step of manually entering the electronic information.

The invention is not limited to these embodiments, as other combinations are contemplated by the invention. Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

Figure 1:
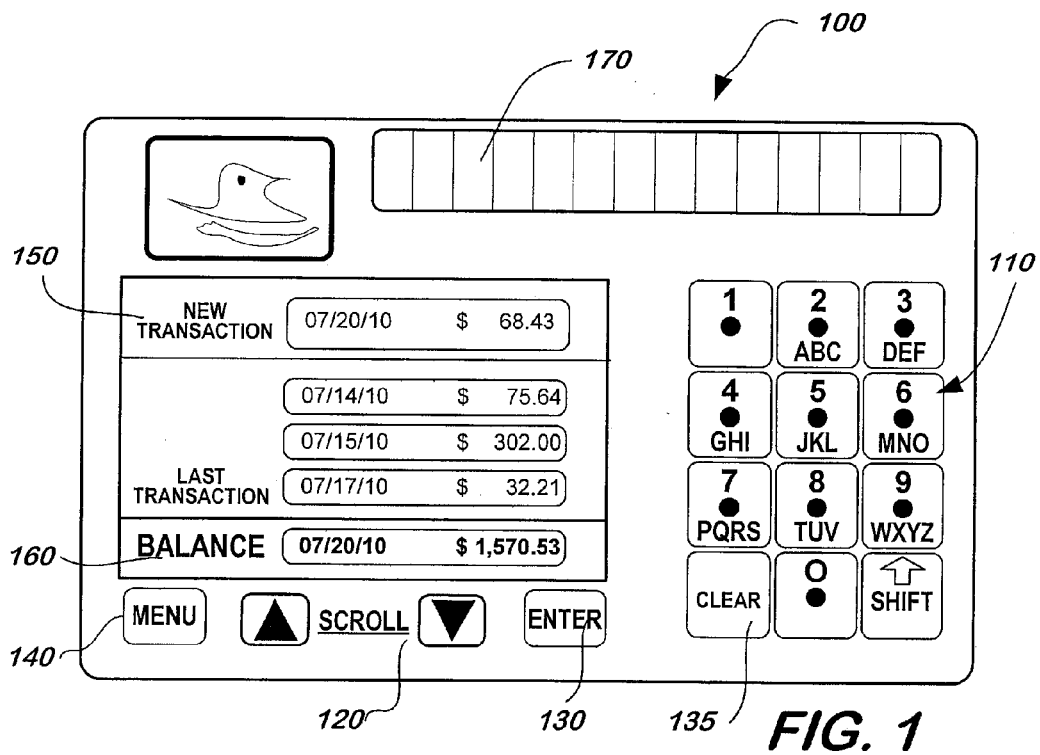
FIG. 1 is a flat view of the front side of a chip card of the present invention.

Regarding FIG. 1, chip card 100 is provided, showing touchpad 110, scrollbar 120, enter button 130, clear button 135, menu button 140, and LCD screen 150. LCD screen 150 shows multiple transactions 152, 155, and 158. The LCD screen also has a prompt to enter in new transactions Chip card 100 may have a second LCD screen 160 showing the balance. Further, FIG. 1 provides solar panel 170 and may have various indicia present on the card. The solar panel and indicia are optional to the card.

The menu button 140 allows for a user to toggle through various options on the card to enter in additional data.

Figure 2:
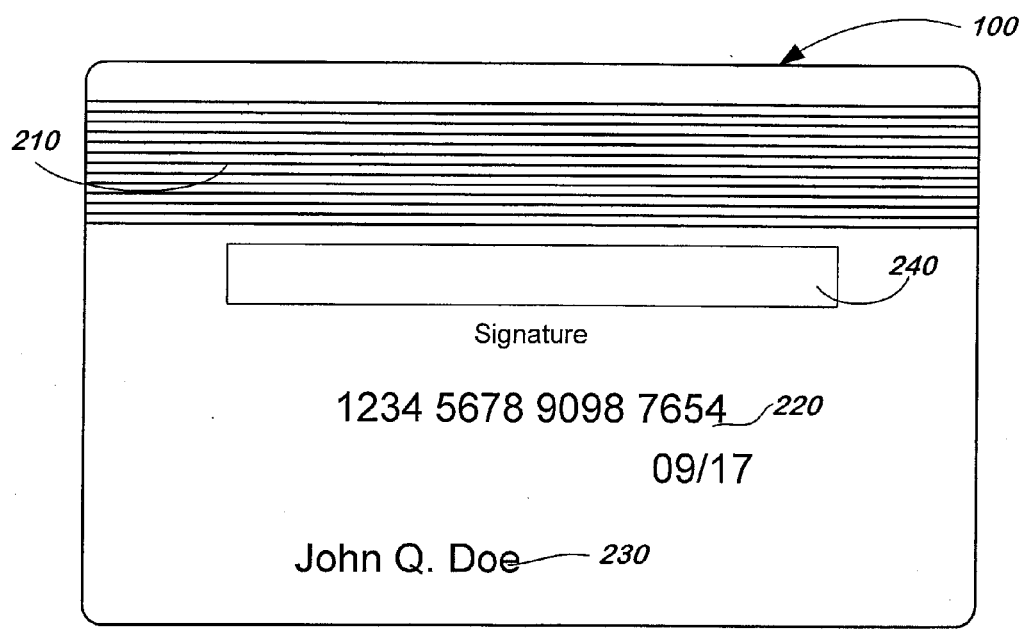
FIG. 2 is a view of the back side of a chip card of the present invention.

FIG. 2 is the back side of chip card 100 showing a magnetic strip 210, credit card number 220 and name 230 and signature field 240.

Figure 3:
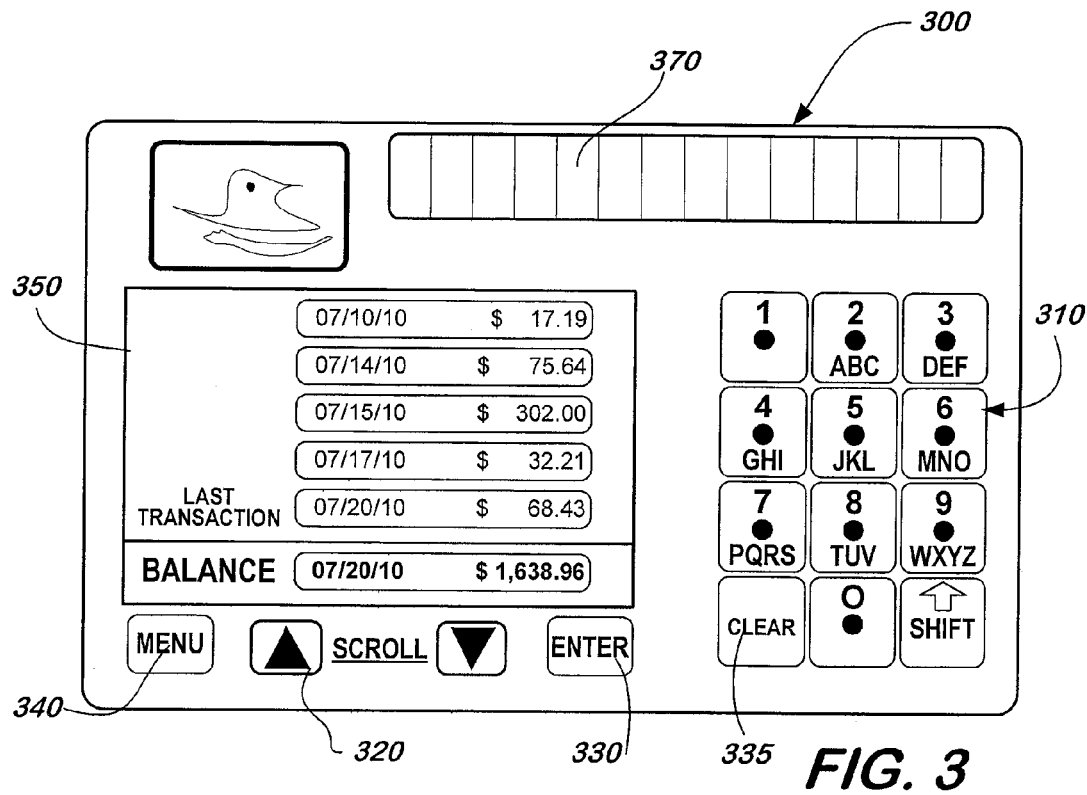
FIG. 3 is flat view of the front side of a chip card of the present invention showing the last five transactions made by a user.

FIG. 3 is the front side of chip card 300 of the present invention showing five transactions 351, 352, 353, 354, and 355. Also touchpad 310, scrollbar 320, enter button 330, clear button 335, menu button 340, LCD screen 350 and solar panel 370 are shown. As in FIG. 1, the solar panel 370 is optional to the chip card.

Figure 4:
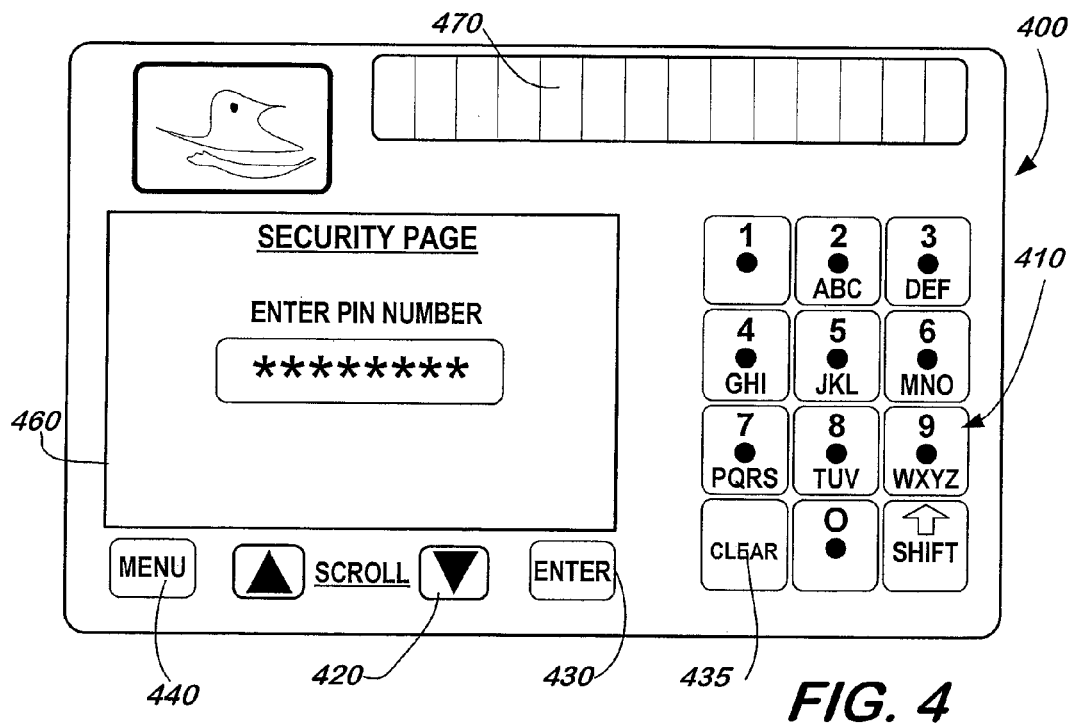
FIG. 4 is a flat view chip of the front side of a chip card of the present invention showing a security page.

FIG. 4 is the front side of chip card 400 requiring a securing-security pin 460 to be entered prior to gaining access to the transaction balance and features of the card. Once the security pin is entered, the LCD 450 switches to a different mode to show transactions, such as in FIG. 1 or FIG. 3.

Figure 5:
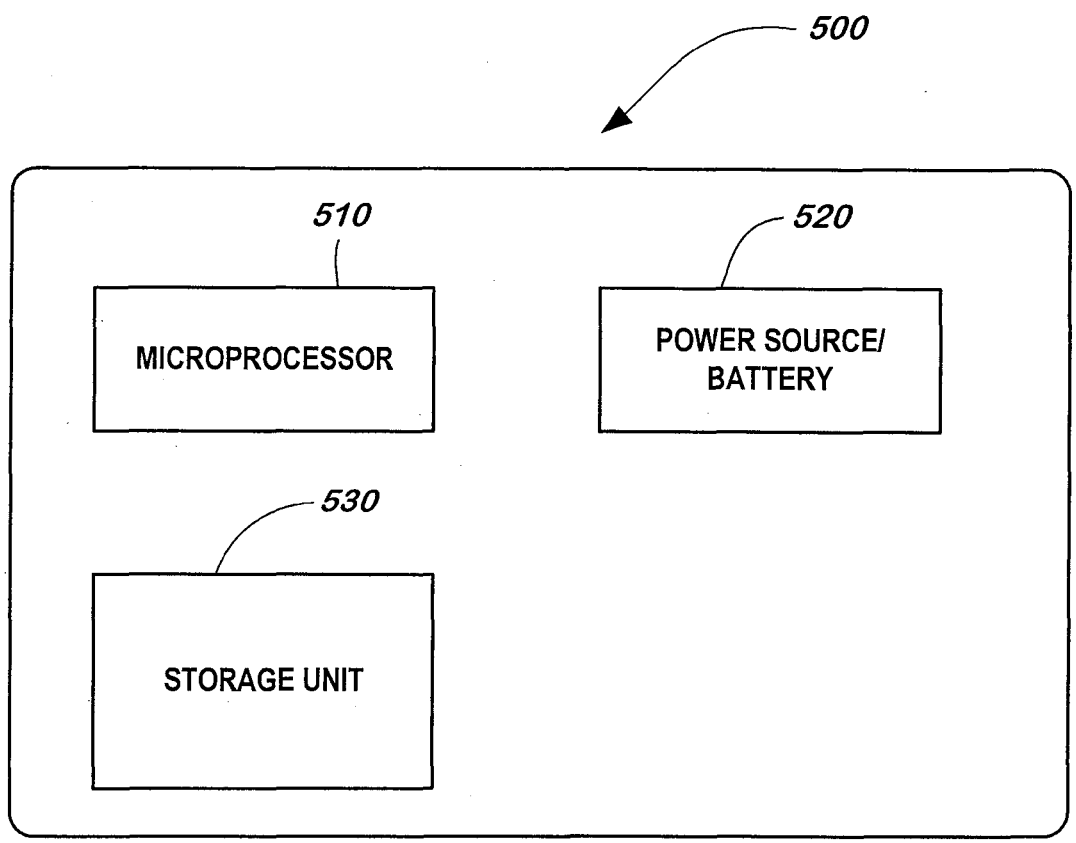
FIG. 5 is a view of a chip card of the present invention showing the microprocessor, power source/battery and storage unit.

FIG. 5 shows a chip card 500 having microprocessor 510, power source/battery 520 and storage unit 530 for storing the transactions. The microprocessor 510 is responsible for communicating with power source/battery 520 and storage unit 530.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A chip card for viewing and storing credit and/or debit card transactions comprising:
    a body having at least two faces;
    at least one storage element enclosed within said body for storing electronic information comprising at least two credit and/or debit card transactions and a current balance;
    at least one processor, said at least one processor able to process and receive electronic information, and said at least one processor enclosed within said body;
    at least one display element for displaying said electronic information, said at least one display element being located on one of said at least two faces of said body; and
    at least one touchpad allowing a user to manually enter said electronic information to be stored by said at least one storage element and displayed by said at least one display element,
    wherein said at least one display element simultaneously displays the at least two credit and/or debit card transactions and the current balance on the face of the at least one display element, so that the user can keep track of the at least two credit and/or debit card transactions and the current balance of the user as they are entered, and
    wherein said at least two credit and/or debit card transactions comprise the date, remaining balance as of the transaction and amount charged.

2. The chip card of claim 1, wherein said at least one display element is an LCD screen.

3. The chip card of claim 1, wherein said at least one touchpad is an alphanumeric pin pad.

4. The chip card of claim 1, wherein said at least one display element displays up to five credit and/or debit card transactions.

5. The chip card of claim 1, further comprising a clearance button for clearing said electronic information.

6. The chip card of claim 1, wherein said at least one touchpad further comprises an enter button for entering in said transactions.

7. The chip card of claim 1, wherein said electronic information further comprises additional data that can be entered via said at least one touchpad.

8. The chip card of claim 1, wherein said processor is a microprocessor.

9. The chip card of claim 1, further comprising a security element, said security element requiring a security pin to be entered prior to allowing said processor to access said at least one storage element for storing electronic information.

10. The chip card of claim 1, wherein said at least one touchpad further comprises a scroll pad allowing a user to scroll through said at least two credit and/or debit card transactions.

11. The chip card of claim 1, further comprising a second display element for displaying the remaining balance left on said chip card.

12. The chip card of claim 1, further comprising a solar panel.

13. A chip card for viewing and storing credit and/or debit card transactions comprising:
    a body having at least two faces;
    at least one storage element enclosed within said body for storing electronic information comprising at least two credit and/or debit card transactions and a current balance;
    at least one microprocessor, said at least one microprocessor able to process and receive electronic information, and said at least one processor enclosed within said body;
    at least one LCD screen for displaying said electronic information, said at least one display element being located on one of said at least two faces of said body;
    a security element requiring a security pin to be entered prior to allowing said processor to access said at least one storage element for storing electronic information;
    at least one alphanumeric pin pad comprising a keypad, a clearance button, an enter button and a scroll pad, said at least one alphanumeric pin pad allowing a user to manually enter said electronic information to be stored by said at least one storage element and displayed by said at least one display element,
    wherein said at least one display element displays the at least two credit and/or debit card transactions and the current balance simultaneously on the face of the at least one display element, so that the user can keep track of the at least two credit and/or debit card transactions and the current balance of the user as they are entered, and wherein said at least two credit and/or debit card transactions comprise the date, remaining balance as of the transaction and amount charged;
    a second display element for displaying the remaining balance left on said chip card; and
    a solar panel.

14. A method for keeping track of a person's spending, said method comprising the steps of:
    (1) providing a chip card comprising:
        a body having at least two faces;
        at least one storage element enclosed within said body for storing electronic information comprising at least two credit and/or debit card transactions and a current balance;
        at least one processor, said at least one processor able to process and receive electronic information, and said at least one processor enclosed within said body;
        at least one display element for displaying said electronic information, said at least one display element being located on one of said at least two faces of said body; and
        at least one touchpad allowing a user to manually enter said electronic information to be stored by said at least one storage element and displayed by said at least one display element;
    (2) manually entering said electronic information; and
    (3) viewing said electronic information on said at least one display element, said at least one display element displaying the at least two credit and/or debit card transactions and the currently balance simultaneously on the face of the at least one display element, so that the user can keep track of the at least two credit and/or debit card transactions and the current balance of the user as they are entered, and wherein said at least two credit and/or debit card transactions comprise the date, remaining balance as of the transaction and amount charged.

15. The method of claim 14, further comprising step of the entering a security pin to allow access to said chip card prior to the step of manually entering said electronic information.

* * * * *